Reissued Sept. 22, 1925.

Re. 16,175

UNITED STATES PATENT OFFICE.

WALTER B. ALLEN, OF WORCESTER, MASSACHUSETTS, ASSIGNOR, BY MESNE ASSIGNMENTS, TO CRAFTEX COMPANY, OF BOSTON, MASSACHUSETTS, A CORPORATION OF MASSACHUSETTS.

INTERIOR-WALL FINISH.

No Drawing. Original No. 1,477,096, dated December 11, 1923, Serial No. 533,667, filed February 2, 1922. Application for reissue filed April 7, 1924. Serial No. 704,888.

*To all whom it may concern:*

Be it known that I, WALTER B. ALLEN, a citizen of the United States, residing at Worcester, in the county of Worcester and State of Massachusetts, have invented new and useful Improvements in Interior-Wall Finish, of which the following is a specification.

The object of my invention is the production of a paint to be applied to interior walls of buildings for the purpose of providing an economical coating and finish.

A further object of the invention is the provision of a paint of this character which shall be water-proof and non-absorbent of moisture and which shall at the same time present an ornamental and attractive appearance.

My composition consists essentially of a mixture of casein with a proportionally small quantity of a suitable solvent therefor and a large quantity of a neutral nonabsorbent mineral filler such as powdered mica.

More specifically, my composition may consist of a mixture of casein, a proportionally small quantity of an alkaline substance such as borax or ammonia, and a large quantity of a neutral mineral filler including mica, either alone or in combination with clay or other silicious materials.

In preparing the composition, I may make use of the ingredients in about the following proportions, namely, eighteen pounds of casein, three pounds of borax or ammonia as the casein solvent or agent assisting in the dissolving of the casein by its neutralization of the acidity thereof, five pounds of hydrated lime, forty-five pounds of powdered mica—180–200 mesh, thirty-five pounds of china clay and seven pounds of oxide of zinc.

Good results may be obtained, however, when the ingredients are varied somewhat in proportions or when only the casein, borax and powdered mica are used, the proportions then being eighteen pounds of casein, three pounds of borax and sixty pounds of powdered mica or other neutral mineral filler.

These ingredients are mixed with any desired coloring matter and a quantity of warm water sufficient to form a fluid of slightly greater consistency than ordinary house paint. It may be applied in one or more coats, but one coat of my composition is generally sufficient to accomplish the desired result.

My composition is equally adapted for a finish over wall paper or plastered surfaces in either new or repair work, and it can usually be applied without any preparation of the surface to which it is to be applied, and can be used in a single coat, thereby producing a finish equal or superior in quality to ordinary paint, more convenient to use and at less expense. In any such use as a finish or in any other use to which my compound may be adapted, whether in thinner or thicker form, the scaly or lamellated condition of the mica or other substance of like character, is of great assistance in providing a slight elasticity to the mass by reason of the large amount of contacting flat surfaces throughout the mass. This coupled with the somewhat flexible character of the binder, which I preferably choose with that character in mind, I am able to obtain a coating which will withstand the come and go not only of the ordinary wall surface, but of such a flexible surface as loose wall paper, canvas or burlap backing. Where mica is used and where its characteristic glitter is not desired, any other mineral filler, such as china clay, provides a dulling or dimming effect so that the mica is rendered inconspicuous while still performing its mechanical function.

What I claim and desire to secure by Letters Patent is:

1. A composition for interior wall finish, comprising eighteen pounds of casein, three pounds of alkali, five pounds of hydrated lime, forty-five pounds of powdered mica,—180–200 mesh,—thirty five pounds of china clay, and seven pounds of oxide of zinc.

2. A composition of matter, comprising casein, a solvent therefor, and mica in such proportions as to form a spreadable coating material by the addition of water.

3. A composition for a wall finish including casein, an alkali, and mica, the proportion of mica being at least double that of the casein.

4. A composition for a wall finish, comprising casein, an alkali, powdered mica, clay, and oxide of zinc.

5. The process of producing a spreadable coating for finishing surfaces, which consists in providing a mixture of casein, a solvent therefor, and mica, and in adding sufficient water thereto to form a fluid of desired consistency.

WALTER B. ALLEN.